T. G. WISDOM.
FEEDER FOR THRESHING MACHINES.
APPLICATION FILED JUNE 10, 1915.
1,269,033.
Patented June 11, 1918.
3 SHEETS—SHEET 1.
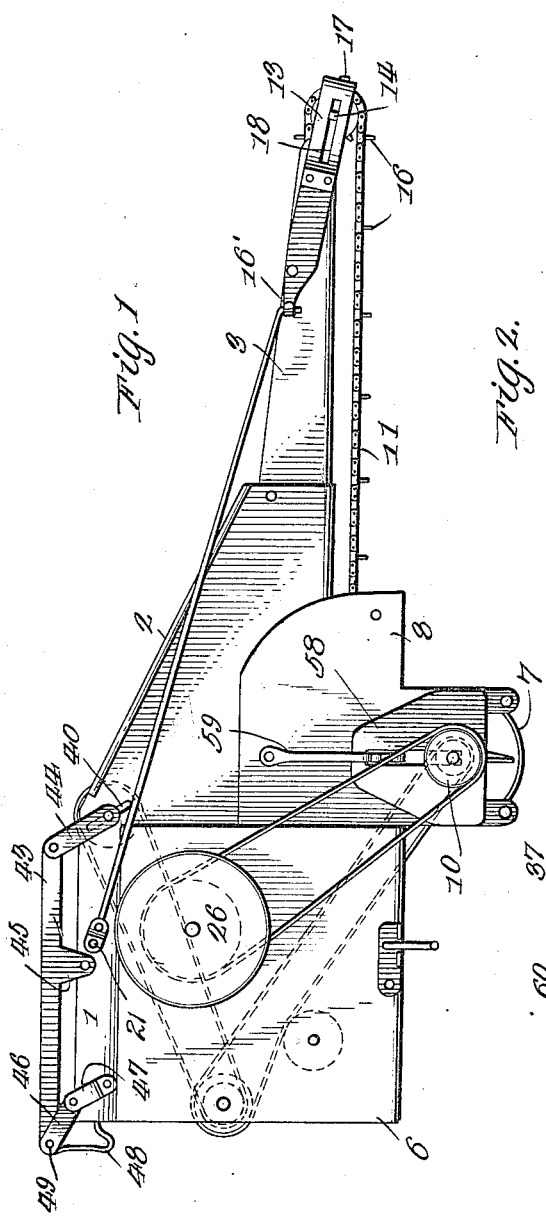
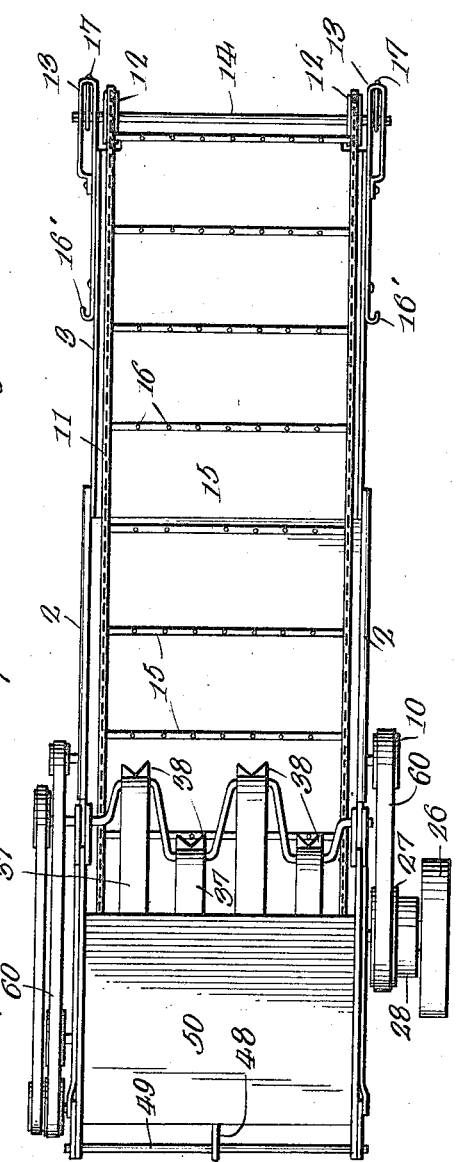
Witnesses
Guy M. Spring.
B. F. Garvey Jr.
Inventor
Thomas G. Wisdom.
By Richard B. Owen.
Attorney

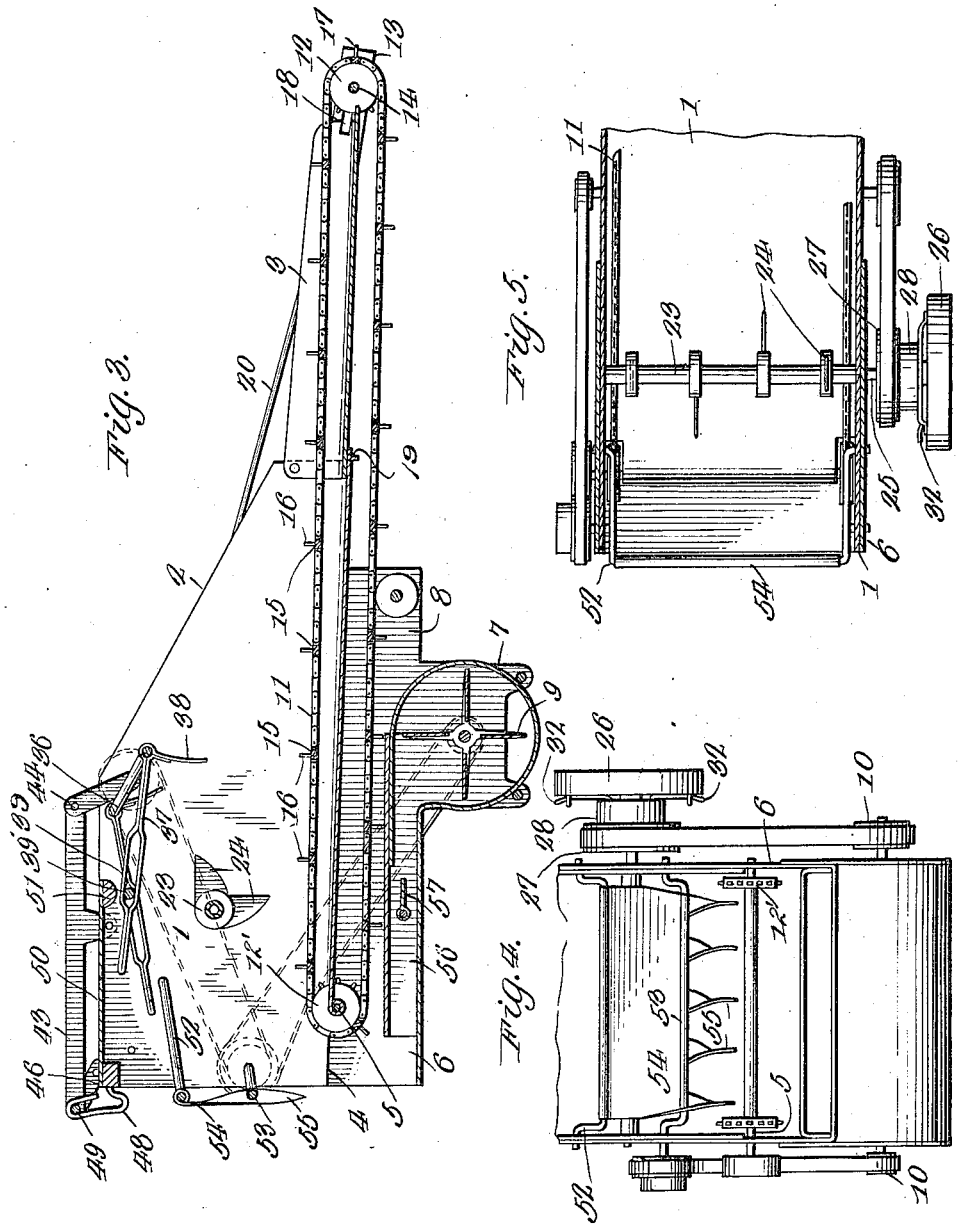

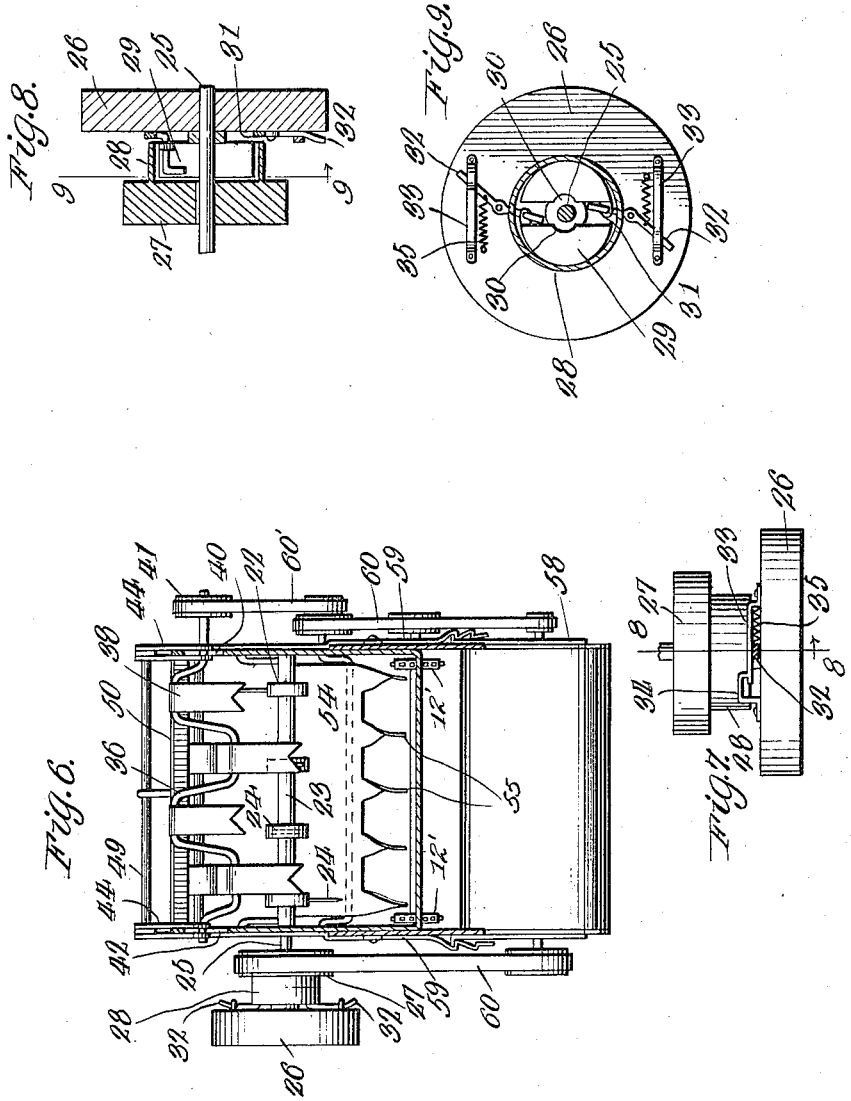

UNITED STATES PATENT OFFICE.

THOMAS G. WISDOM, OF ADMIRE, KANSAS.

FEEDER FOR THRESHING-MACHINES.

1,269,033.

Specification of Letters Patent.

Patented June 11, 1918.

Application filed June 10, 1915. Serial No. 33,242.

*To all whom it may concern:*

Be it known that I, THOMAS G. WISDOM, a citizen of the United States, residing at Admire, in the county of Lyon and State of Kansas, have invented certain new and useful Improvements in Feeders for Threshing-Machines, of which the following is a specification.

This invention relates to feeders for threshing machines, the primary object of which is to adequately feed the grain into the threshing cylinder, facilitating threshing of the grain.

A further object of the invention is to prevent congestion of the grain in the feeder in proximity to the band cutter, thereby expediting cutting of the bands from the grain shocks, and enabling the latter to be separated for expediting threshing.

A further object of the invention is to provide an endless conveyer which is adjustable so as to take up the slack when so desired, the conveyer being foldable in conjunction with a portion of the frame, when so desired, so as to occupy a minimum amount of space.

Other objects as well as the nature, characteristic features and scope of my invention will be more readily understood from the following description taken in connection with the accompanying drawings and pointed out in the claims forming a part of this specification.

Referring to the drawings:

Figure 1 is a side elevational view of a carrier constructed in accordance with my invention, Fig. 2 is a top plan view of the same, Fig. 3 is a longitudinal sectional view of the device, Fig. 4 is a detail fragmentary enlarged end elevational view of the device, Fig. 5 is a detail fragmentary top plan view, a portion thereof being broken away to disclose details, Fig. 6 is a horizontal sectional view of the device showing to advantage the means for retarding the trend of the grain shock, in order to prevent congestion in proximity to the band cutters.

Fig. 7 is a plan view of the power wheel and the friction means for imparting movement to the wheel, a portion thereof being shown in section, and a portion of the shaft being broken away, Fig. 8 is a sectional view taken on the line 8—8 of Fig. 7 and looking in the direction of the arrows, and Fig. 9 is a sectional view taken on the line 9—9 of Fig. 8 and looking in the direction of the arrows.

In the drawings, a main frame 1 is provided which in the present instance is of a rectangular configuration, having a portion of the sides of the forward end thereof inclined, as indicated at 2. A sub-frame 3 is pivotally associated with the inclined sides of the frame 1, and is of a lateral range, slightly smaller than the range of the main frame, thereby permitting the sub-frame to be folded into the main frame when desired, so as to occupy a minimum amount of space. A portion of the bottom of the frame 1, and at the rear of the latter, is broken away, as designated at 4, the free end of the bottom being rolled about the shaft 5, the latter having a pair of sprocket wheels 12' keyed thereon in proximity to the inner faces of the opposite sides of the frame. The shaft 5 is journaled subjacent the lower free margins of the sides of the frame, at the point 4 in the opposite side of a hood 6. The hood 6 comprises a U-shaped metallic plate, the vertex of which is arranged to lie appreciably below the bottom of the frame 1, as illustrated to advantage in Fig. 3, while the sides thereof are contiguous, and fixedly engaged with the opposite sides of the frame 1. A portion of the forward end of the bottom of the hood is depressed to provide a substantially cylindrical cylinder 7, the latter being interposed between side-flaps 8, which depend from the forwardly inclined sides of the frame 1. A fan 9 is revolubly mounted in the cylinder 7, the shaft thereof being journaled in the flaps 8 and having mounted thereon suitable pulley-wheels 10 through the instrumentality of which motion is imparted to the fan 9.

An endless belt or conveyer 11 is movably associated with the frame 1, and sub-frame 3, the upper run of the conveyer being superposed the floor or bottom of the frames 1 and 3, while the lower run is arranged subjacent the bottom of each of said floors, as shown to advantage in Fig. 3. The conveyer embodies a pair of sprocket chains which are trained over sprocket wheels 12 and 12', the former being mounted loosely upon a shaft 14 which is slidably mounted in slotted bearings 13 extended from the free end of the sub-frame 3, while the sprocket wheels 12′ are mounted upon the opposite ends of the shaft 5. A suitable apron is mounted between the sprocket chains and engaged therewith having mounted thereon in equi-distantly spaced relation, transverse strips 15 in which suitable pins 16 are mounted, thereby preventing casual displacement of the shocks after they are placed on the conveyer. Each of the bearings 13 is formed from a metallic strap, one end of which is fixedly engaged with the sub-frame 3, the terminal thereof being reversely bent into a hook 16′ for a purpose hereinafter set forth. The opposite end of each of the straps is reversely folded and arranged in spaced relation to accommodate a keeper 17 therein, whereby the shaft 14 is retained in a predetermined position. Each keeper in this instance comprises wire strands, which as is obvious are readily removed should it be desired to move the shaft 14, the latter being mounted in longitudinal slots 18 in the bearings 13, as illustrated in Fig. 1.

An abutment 19 is carried upon the lower face of the bottom of the sub-frame 3 adjacent the inner end of the latter, and is adapted to contact with the inner end of the main frame 1, as shown in Fig. 3, thereby limiting the downward movement on the frame 3. In order to positively preclude casual displacement of the sub-frame 3 from the main frame 1, suitable guy-rods 20 are provided, one end of each of which is fixedly engaged with ears 21 on the opposite sides of the main frame 1, while the opposite ends of each is detachably engaged with the bill of the hook 16′ of the bearing strap 13. It will therefore be appreciated that the sub-frame 3 may be folded within the plane of the sides of the main frame 1 when so desired, so as to occupy a minimum amount of space, and may be expeditiously thrown into an operative position at the option of the user.

A band cutter mechanism 22 is movably associated with the main frame 1 and is operable within the plane of the sides of the latter, and in the path of movement of the shocks of grain carried upon the conveyer 11. The mechanism comprises a tube 23 having knives 24 alternately arranged thereon. The tube 23 is sleeved upon a shaft 25, the latter extending through one of the sides of the frame 1 and having a drive-wheel 26 loosely mounted upon its extremity, and a power wheel 27 keyed on the shaft between the drive-wheel 26 and the side of the frame 1, through which the shaft is extended. A housing 28 is fixedly mounted upon the outer face of the power wheel 27 and has mounted therein a pair of friction shoes 29, each of the latter being of a semi-circular configuration, which when engaged are of a diameter smaller than the interior diameter of the housing 28, so as to permit expansion of said shoes within the housing. It will be noted that the proximate faces of the shoes 29 are provided with semi-circular depressions 30 therein, the latter adapted to receive the shaft 25. An ear 31 is formed upon each of the shoes 29 and has mounted therein one end of an operating lever 32, the latter having its terminal bent at right angles to the portion of the lever which is engaged through the ear, whereby motion of the lever on its axis will impart movement to the shoe to throw the same into engagement with the inner periphery of the housing 28. The opposite end of each of the operating levers 32 is movably mounted beneath a suitable frame member 33 and being retainable from movement in the latter, in view of an offset portion 34 thereof, as illustrated to advantage in Fig. 7. A coil spring 35 is associated with each of the levers 32, so as to normally exert pressure on the shoes 29 for normally holding the same in close proximity to each other.

A suitable mechanism is associated with the opposite sides of the frames 1, so as to preclude congestion of the shocks in the frame, in proximity to the band cutter mechanism 22, said anticongestion mechanism comprising a shaft 36, which is provided throughout its length with a plurality of cranks upon each of which is journaled the angle of an arm 37, from which angle depends a fork 38. Each fork is dished slightly as best seen in Fig. 3, and the direction of rotation of the crank shaft is such that the fork acts in the nature of a kicking rake, knocking back away from the cutter those shocks which approach it upon the single row of shocks which lies on the endless belt. Hence the function of these kicking forks is to prevent congestion at the point where the cutting of the band occurs. A portion of each of the arms 37 is looped, as indicated at 39, said loops being slidably associated with a shaft 39′ thereby limiting the movement of said arms. One end of the crank-shaft is extended through a slot 40 in one side of the frame 1 and has a pulley wheel 41 thereon, and through the medium of which motion is imparted to said shaft. The opposite end of the shaft is mounted through a slot 42, whereby simultaneous adjustment of the forks is permissible, the latter being held in a predetermined position by a frame structure 43 which is above the hood 6 and is in pivotal connection with the opposite sides of the frame 1. The forward end of the structure 43 is in pivotal connection with links 44, a pair of said links engaging one side of the frame 1, embracing each side of the frame 1, and on opposite sides of the slots 40 and 42, and being in engagement with the ends of the U-shaft comprising a portion of the mechanism 36. Ears 45 depend from the structure 43 and are in pivotal engagement with the upper outer faces of the sides of the frame 1, the rear end of said structure having links 46 pivoted thereon, the latter being in turn pivotally engaged with straps 47. In order to hold the structure 43 in close proximity to the upper end of the frame 1, a spring loop 48 is carried by the top of the frame 1 and is engaged by a shaft 49, which connects the opposite sides of the structure 43.

The top 50 of the frame 1 is hingedly mounted between the opposite sides of the frame, whereby access is gained to the interior of the frame for adjusting the mechanism therein if so desired. The top 50 is movable on pintles carried in the opposite ends of a stay 51, the latter being illustrated to advantage in Fig. 3.

A U-shaped shaft 52 is movably mounted between the side walls of the frame 1, and has the free terminals thereof bent at right angles to the body and journaled in said sides, while the vertex of the U is movable through a very limited arc, so as to extend, at times, beyond the rearward end of the frame 1, the movement of said shaft 52 being limited in view of an auxiliary shaft 53, the latter having its opposite ends journaled in the opposite sides of the frame 1, in close proximity to the ends of the side walls of the rear of the frame, as shown to advantage in Fig. 3. A sheet metal member 54 has one of its terminals coiled about the vertex of the shaft 52, the opposite ends thereof being formed to provide a plurality of teeth 55, the extreme lateral teeth of said sheet being engaged by the vertex of the auxiliary shaft 53, as illustrated to advantage in Fig. 4. The teeth 55 are adapted to convey the grain from the rear end of the conveyer 11, so as to project the same downwardly, and incidentally considerably scattering the straw.

In order to project the straw into the threshing cylinder, after the straw has been removed by the teeth 55, a suitable air medium is provided, the source of which is the air blast fan 9 heretofore described, which is mounted in the cylinder 7. The air is conducted through a channel 56 formed in the bottom of the hood 6, and has mounted therein a damper 57 which controls the movement of the atmosphere, after the same has been generated by the fan 9. The channel 56 terminates short of the end of the hood 6, as shown to advantage in Fig. 3, whereby the grain will be permitted to drop from the end of the conveyer, being scattered and aided in gravitation in view of the teeth 55, the air blast forcing the grain into the threshing cylinder, which is adapted for association with the rear end of the frame 1.

Slides 58 are movably mounted upon the opposite ends of the cylinder 7, and are held in a predetermined position through the medium of catches 59, as advantageously illustrated in Fig. 1. It is, of course, obvious that the slides 58 will regulate the inflow of atmosphere into the cylinder 7, and they are provided with suitable slots, in which the fan-shaft is mounted.

In operation, motion is imparted to the wheel 26 by the same source of power that operates the threshing machine, so that the wheel 26 and threshing machine mechanism will be simultaneously operated. Initial movement of the wheel 26 will, of course, have no effect upon the shaft 25, in view of the fact that said wheel 26 is loosely mounted upon said shaft, but accelerated movement of said wheel will cause the shoes 29 to fly outward, and frictionally engage the inner periphery of the housing 28, thereby bracing the same in operative connection with the shaft 25, so as to simultaneously operate the power wheel 27, with the wheel 26. This peculiar formation will enable the threshing machine to be running at a desired velocity, so as to adequately thresh the grain, before the conveyer is operated for carrying the grain into the threshing cylinder. The shoes 29 in moving will, of course, operate against the resistance of the springs 35, and if desired, the levers 32 may be placed in the depressed portions 34 of the frames 33, should it be desired to impart movement immediately to the shaft 25. The shaft 25 is in operative connection with the fan-shaft, the crank-shaped shaft of the anti-congesting mechanism 38, and the shafts 25 and 52, through the instrumentality of belts 60, thereby actuating all of the mechanism heretofore described, for producing the result specified, just as soon as motion is imparted to the shaft 25.

As the shocks move from the right toward the left in Fig. 3 and approach the cutter 24, the kicking forks 38 revolving in the direction of the arrow drawn adjacent to them, which is reverse to the direction of movement of the upper side of the feed belt, will knock backward toward the feed end of the machine those shocks which are piled upon the single row lying upon said feed belt. The shocks in this row may pass under the cutter and their bands be severed by the knives thereof without congestion, but it is obvious that if the shocks were piled too plentifully upon the feeder, the cutter might become congested and the continuous movement of the machine interrupted. When it is desired to adjust the crank shaft in the slots 40 and 42 so that the kicking forks may work through a path higher than that illustrated, the entire frame structure 43 is rocked on its pivotal ears 45, and the shaft 49 slipped down to the lower ends of the loops 48 which are purposely made of resilient material in order to permit this movement, and the links 44 draw the crank shaft upward and with it the anti-congesting mechanism. Thus the operator may set the machine to handle larger or smaller shocks, at will.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. In a shock feeder for band cutters, the combination with a main frame, and an endless belt movable in a substantially horizontal path within said frame; of a crank shaft rotating within said frame above the belt, a series of kicking forks carried by its cranks and moved thereby in a direction to relieve congestion on the feeder, a rocking frame structure on said main frame connected at its front end with said crank shaft and having a cross shaft at its rear end, and spring loops on the main frame yieldably engaging said cross shaft in the different positions of the frame structure.

2. In a device of the class described, the combination with a main frame having substantially upright slots in its sides near its upper portion, and a substantially horizontal belt moving within the frame beneath said slots and constituting a feeder; of a crank shaft whose ends are mounted in said slots, a series of kicking forks carried on its cranks within the main frame, means for rotating said shaft in a direction to cause the forks to act reversely on material piled upon said carrier in excess of its normal capacity, a frame structure having ears at its mid length pivoted to said main frame, links connecting its front end with said crank shaft inside the side face of said main frame, and means at the rear end of the frame structure for locking it in adjusted position, as described.

In testimony whereof I affix my signature in presence of two witnesses.

THOMAS G. WISDOM.

Witnesses:
C. V. BEST,
B. M. HIERONYMUS.

Copies of this patent may be obtained for five cents each, by addressing the "Commissioner of Patents, Washington, D. C."